United States Patent
Smith et al.

(10) Patent No.: US 6,385,623 B1
(45) Date of Patent: May 7, 2002

(54) SYSTEM AND METHOD FOR ENSURING PROPER EXECUTION OF SCHEDULED FILE UPDATES

(75) Inventors: T. Gaven Smith, Pflugerville; Vamsi Ayyagari, Austin, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/439,209

(22) Filed: Nov. 12, 1999

(51) Int. Cl.⁷ .......................... G06F 12/00; G06F 17/30
(52) U.S. Cl. ........................................... 707/200
(58) Field of Search ................... 707/100, 101, 707/200–205, 500–530, 206; 713/12, 100

(56) References Cited

U.S. PATENT DOCUMENTS

| | | | | |
|---|---|---|---|---|
| 5,537,592 A | * | 7/1996 | King et al. ................... | 395/600 |
| 5,568,639 A | * | 10/1996 | Wilcox et al. ............... | 395/600 |
| 5,600,834 A | * | 2/1997 | Howard ....................... | 395/617 |
| 5,778,395 A | * | 7/1998 | Whiting et al. ............. | 707/204 |
| 5,806,078 A | * | 9/1998 | Hug et al. .................... | 707/511 |
| 5,873,097 A | * | 2/1999 | Harris et al. ................. | 707/203 |
| 5,894,571 A | | 4/1999 | O'Connor .................... | 395/625 |
| 6,067,567 A | * | 5/2000 | Bartfai et al. ................ | 709/211 |
| 6,076,105 A | * | 7/2000 | Wolff et al. .................. | 709/223 |
| 6,178,428 B1 | * | 1/2001 | Pystynen et al. ............ | 707/205 |

* cited by examiner

Primary Examiner—John Breene
Assistant Examiner—Linh M Pham
(74) Attorney, Agent, or Firm—Haynes and Boone, LLP

(57) ABSTRACT

Method and apparatus for ensuring that file updates scheduled in a Wininit.ini file are applied with regard to previously existing versions and multiple instances of such updates are described. In one aspect, a computer program is installed on a computer system and executed after all file update entries have been made to a Wininit.ini file, but before the computer system is rebooted. If duplicate entries exist in the Wininit.ini file for a single destination file, the computer program determines which entry contains the newest source file based first on the version of the source file, if any, and then on the date/time stamp for the source file. The Wininit.ini entries referring to older source files, as well as the files themselves, are then marked for deletion and/or deleted before the computer system is rebooted. In the event that the destination file is the newest version of the file, all entries referring to the destination file, as well as corresponding source files, will be marked for deletion and/or deleted before the computer system is rebooted.

27 Claims, 3 Drawing Sheets

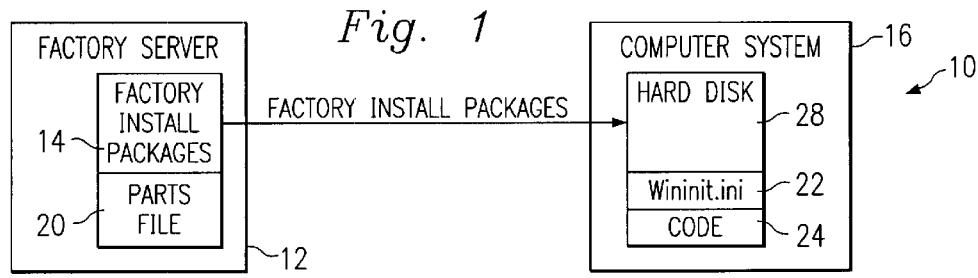
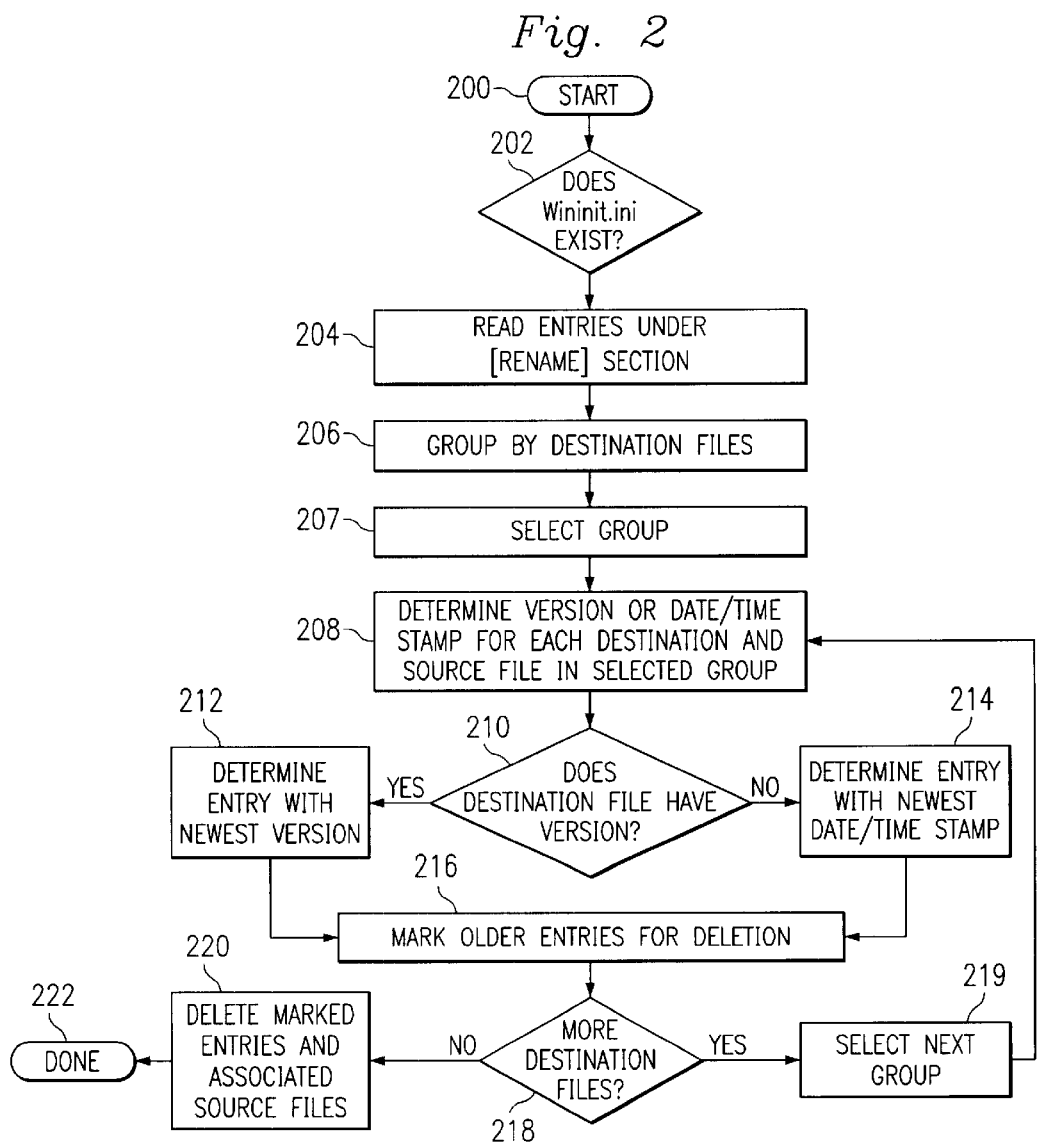

BEFORE PARSING AND EXECUTING WININIT.INI

Wininit.ini (Destination File=Source File)

[rename]
c:\windows\system\ole32.dll=c:\windows\system\ole32.001          DATE        VERSION
c:\progra~1\micros~2\iexplore.exe=c:\progra~1\micros~2\iexplore.bak   11-26-97,  NO VERSION
c:\windows\system\ole32.dll=c:\windows\system\ole32.002          01-06-98,  VERSION 1.21
c:\windows\system\ole32.dll=c:\windows\system\ole32.003          10-16-98,  NO VERSION
c:\windows\runprog.exe=c:\windows\file0028.tmp                   08-21-98,  NO VERSION
c:\progra~1\micros~2\iexplore.exe=c:\progra~1\micros~2\iexplore.001   05-17-98,  NO VERSION
                                                                 04-13-98,  VERSION 1.19

Fig. 3a

Destination Files on the Hard Drive

Directory of C:\WINDOWS\SYSTEM
OLE32     DLL    775,440  06-12-98   1:00p  OLE32.DLL          NO VERSION Directory of C:\Program Files\Microsoft Internet Explorer
IEXPLORE   EXE    501,625  05-11-98   7:42a  IEXPLORE.EXE       VERSION 1.20

Directory of C:\WINDOWS
RUNPROG    EXE     31,832  08-29-98   3:26p  RUNPROG.EXE        NO VERSION

Fig. 3b

AFTER PARSING AND EXECUTING WININIT.INI

```
Wininit.ini
[rename]
c:\progra~1\micros~2\iexplore.exe=c:\progra~1\micros~2\iexplore.bak    DATE       VERSION
c:\windows\system\ole32.dll=c:\windows\system\ole32.002                01-06-98,  VERSION 1.21
                                                                       10-16-98,  NO VERSION
```

*Fig. 3c*

```
Destination Files on the Hard Drive

Directory of C:\WINDOWS\SYSTEM
OLE32       DLL    801,243   10-16-98   2:12p   OLE32.DLL          UPDATED BY Wininit.ini Directory of C:\Program Files\Microsoft Internet Explorer
IEXPLORE    EXE    505,879   01-06-98   7:48a   IEXPLORE.EXE       UPDATED BY Wininit.ini Directory of C:\WINDOWS
RUNPROG     EXE     31,832   08-29-98   3:36p   RUNPROG.EXE        NOT UPDATED BY Wininit.ini
```

*Fig. 3d*

SYSTEM AND METHOD FOR ENSURING PROPER EXECUTION OF SCHEDULED FILE UPDATES

BACKGROUND

The disclosures herein relate generally to factory-installation of software and, more particularly, to a method of ensuring that scheduled file updates are applied with regard to previously existing versions and multiple instances of said updates.

This application relates to co-pending U.S. patent application Ser. No. 09/060,123, filed on Apr. 14, 1998, entitled LATE BINDING DYNAMIC SOFTWARE CONFIGURATION INFORMATION, naming Varnsi Ayyagari as an inventor. The co-pending application is incorporated herein by reference in its entirety, and is assigned to the assignee of this invention.

When an attempt is made to overwrite a file in a WINDOWS 9x operating system (hereinafter "WINDOWS"), sometimes the file is in use, or "busy", and hence cannot be overwritten. Some files are in use as soon as WINDOWS starts, so it is necessary to perform overwrites to these files prior to WINDOWS using the file. Microsoft created a Wininit.ini file to facilitate such file updates. In particular, when an attempt is made to overwrite a busy file, a corresponding entry indicating the overwrite or update, to be performed, is made in the Wininit.ini file. Each entry indicates the destination file (i.e., the file to be overwritten) and a source file containing the data with which the destination file is to be overwritten. Each time WINDOWS is booted, the file updates scheduled in the Wininit.ini file, if such a file is present, are executed line-by-line from top to bottom.

A notable deficiency of the foregoing solution is that no date or version checking is performed when the scheduled updates are performed. This becomes a problem when Wininit.ini contains two entries pertaining to the same destination file. In cases such as this, both source files may be newer than the destination file, but there can be no guarantee that the entry corresponding to the newest source file(if the source files are different) will be listed last in Wininit.ini and thus used to overwrite the destination file last. As a result, it is possible that the computer system could include an older version of the particular file than an application or driver is expecting. This problem occurs quite often in connection with the factory-installation of software, due to the fact that a build-to-order ("BTO") computer system manufacturer is capable of shipping a computer system having almost any combination of applications and drivers, which often share common files.

For example, in one manufacturing environment, a "PARTS" file for a BTO computer system contains a list of software "parts" identified by part number to be downloaded from a factory server and installed on the computer system. These parts, which are installation packages for various applications and drivers, are installed on the computer system in the order in which they are listed in the PARTS file for the computer system. It is common for each of these packages to attempt to update certain system files during installation thereof. As described above, when the files to be updated are busy, as will be the case with WINDOWS system files, the updates are scheduled in a recognized manner using the Wininit.ini file. A potential problem arises in cases in which two different installation packages make schedule updates to the same destination file. In this case, if the package that is installed last happens not to contain the newest update to the destination file, an application or driver that was installed earlier and expects a newer version of the file might not function properly.

One solution to this problem has been to drop the source file contents directly into the zip file to be applied during system download prior to setting up WINDOWS. This ensures that the destination file will be updated because there is no chance of it being busy at this point. Unfortunately, this method can result in newer versions of the file to be overwritten, because the manufacturer's implementation of the PKUNZIP utility may not perform date/time stamp or version checking. In addition, a long filename directory cannot be created in DOS, so if the file to be unzipped needs to be in such a directory and the directory is not already in existence, the method will not work. Finally, this method requires file updates to be made before operating system ("OS") setup is performed, whereas the OS might require the original (i.e., older) versions of a file in order to set up properly.

An alternative solution to the above-described problem is to change the order in which the software is installed on the computer system. However, while this alleviates the problem between conflicting scripts, it could result in a new set of files being affected by the aforementioned Wininit.ini problem.

Finally, it would be possible to make a separate patch containing only the file to be applied and have it execute after the next WINDOWS boot. Unfortunately, this technique requires additional work each time the problem is encountered and can be subject to the same problems described above, due to its dependence on Wininit.ini if the file to be overwritten is busy.

Therefore, what is needed is a system for ensuring scheduled file updates are applied with regard to previously existing versions and multiple instances of said updates.

SUMMARY

One embodiment, accordingly, provides a method and apparatus for ensuring that file updates scheduled in a Wininit.ini file are applied with regard to previously existing versions and multiple instances of such updates. In one aspect, a computer program is installed on a computer system and executed after all file update entries have been made to a Wininit.ini file, but before the computer system is rebooted. If duplicate entries exist in the Wininit.ini file for a single destination file, the computer program determines which entry contains the newest source file based first on the version of the source file, if any, and then on the date/time stamp for the source file. The Wininit.ini entries referring to older source files, as well as the files themselves, are then marked for deletion and/or deleted before the computer system is rebooted. In the event that the destination file is the newest version of the file, all entries referring to the destination file, as well as corresponding source files, will be marked for deletion and/or deleted before the computer system is rebooted.

A principal advantage of this embodiment is that it ensures that the newest version of a file is installed on a computer system.

BRIEF DESCRIPTION OF THE DRAWING FIGURES

FIG. 1 illustrates an environment for implementing an embodiment.

FIG. 2 is a flowchart of the operation of the embodiment of FIG. 1.

FIGS. 3a and 3b illustrate, respectively, a Wininit.ini file and a list of destination files prior to application of the embodiment illustrated in FIG. 2.

FIGS. 3c and 3d illustrate, respectively, a Wininit.ini file and a list of destination files subsequent to application of the embodiment illustrated in FIG. 2.

DETAILED DESCRIPTION

FIG. 1 is an illustration of an environment 10 for implementing an embodiment described herein. The environment 10 includes a factory server 12 having stored thereon a plurality of factory install packages 14 for applications and drivers to be preinstalled on build-to-order ("BTO") computer systems, represented in FIG. 1 by a computer system 16. Each of the factory install packages 14 is identified by a part number and a separate factory install package is created in a conventional fashion for each application or driver available for installation on BTO computer systems.

During a factory-installation stage, responsive to a command from the computer system 16 to the factory server 12 to download one of the factory installation packages 14 corresponding to a selected part number, the factory-install package is downloaded from the server to the computer system onto which the application or driver is to be preinstalled.

In particular, a "PARTS" file 20 for the computer system 16 includes a list of part numbers corresponding to selected installation packages for applications and drivers to be installed thereon. The selected packages are downloaded to, and the applications and drivers installed on, the computer system 16 in the order in which they are listed in the PARTS file 20. As previously described, it is not uncommon for each of the packages to attempt to update certain system files of the computer system 16 during installation thereof. When the files to be updated in this manner are busy, as will be the case with WINDOWS system files, the updates are scheduled in a recognized manner using a Wininit.ini file 22. In particular, when an attempt is made to overwrite a busy file, a corresponding entry, indicating the overwrite, or update, to be performed, is made in the Wininit.ini file 22. Each entry indicates the destination file (i.e., the file to be overwritten) stored on a hard drive 28 of the computer system 16 and a source file containing the data with which the destination file is to be overwritten. Each time WINDOWS is booted, the file updates scheduled in the Wininit.ini file 22 are executed line-by-line from top to bottom.

As will be described in greater detail with reference to FIGS. 2 and 3a–3d, in accordance with the embodiment described herein, when the computer system 16 reboots, prior to performing the updates scheduled in the Wininit.ini file 22, code 24 is executed that performs version and/or date and time stamp checking with respect to the scheduled updates to ensure that the newest version of each file is installed on the computer system 16.

FIG. 2 is a flowchart of the operation of the code 24 of embodiment of FIG. 1. Execution begins in step 200. In step 202, a determination is made whether a Wininit.ini file exists. If so, execution proceeds to step 204, in which entries in a [rename] section of the Wininit.ini file are read. In step 206, the entries read in step 204 are grouped by destination file.

In step 207, the first group is selected for processing. In step 208, the version and/or date and time stamp for the destination file and each source file of the currently selected group are determined. In step 210, a determination is made whether the destination file of the currently selected group has a version. If so, execution proceeds to step 212, in which the entry of the currently selected group that includes the newest version of the file (including both destination and source files) is selected; otherwise, execution proceeds to step 214, in which the entry of the currently selected group that includes the file (including both destination and source files) having the newest date and time stamp, is selected. Upon completion of step 212 or 214, execution proceeds to step 216, in which the non-selected Wininit.ini file entries of the currently selected group are marked for deletion.

In step 218, a determination is made whether there are more groups to process. If so, execution proceeds to step 219 in which the next group is selected for processing, and then returns to step 208. Otherwise, execution proceeds to step 220, in which the marked entries and their associated source files are deleted. Alternatively, at this step 220, the associated source files may simply be marked for deletion, e.g., by an appropriate entry in the appropriate section of the Wininit.ini file, in which case, the actual deletion of the file would take place upon execution of the Wininit.ini file after the computer is rebooted. Execution terminates in step 222. Similarly, if in step 202 it is determined that a Wininit.ini file does not exist, execution proceeds directly to step 222. At this point, the Wininit.ini file is executed in a normal fashion the next time the computer is booted.

Operation of the method of FIG. 2 will now be further described with reference to an example illustrated in FIGS. 3a–3d. In particular, FIGS. 3a and 3b illustrate, respectively, a Wininit.ini file 300 and a list 302 of entries 303a, 300b, and 303c corresponding to destination files stored on the hard drive of a computer system prior to parsing and execution of the Wininit.ini file in accordance with the embodiment described herein. FIGS. 3c and 3d illustrate, respectively, an updated Wininit.ini file 300' and an updated list 302' of entries 303a, 303b, and 303c', corresponding to destination files stored on the hard drive of the computer system after parsing and execution of the Wininit.ini file in accordance with the embodiment described herein.

Referring again to FIG. 2, execution begins in step 200. In step 202, a determination is made that a Wininit.ini file exists (Wininit.ini file 300). Accordingly, execution proceeds to step 204, in which entries 307a–307f in a [rename] section 308 of the Wininit.ini file 300 are read. In step 206, the entries 307a–307f are grouped by destination file. For example, as shown in FIG. 3a, the first, third and fourth entries 307a, 307c, and 307d, respectively, relating to a "c:\windows\system\ole32.dll" (hereinafter "c:\windows\system") destination file, as well as the destination file entry 303a, are grouped together in a first group; the second and sixth entries 307b, and 307f, respectively, relating to a "c:\progra~1\micros~2\iexplore.exe" (hereinafter "c:\progra~1") destination file, as well as the destination file entry 303b, are grouped together in a second group; and the remaining entry 307e, relating to a "c:\windows\runprog.exe" destination file, as well as the destination file entry 303c, are grouped together in a third group.

In step 207, the first group, relating to the c:\windows\system destination file, is selected for processing. In step 208, the version and/or date stamps for the entries of the c:\windows\system group are obtained. In particular, the entry 307a has no version and a date stamp of Nov. 26, 1997; the entry 307c has no version and a date stamp of Oct. 16, 1998; the entry 307d has no version and a date stamp of Aug. 21, 1998. The destination file, as represented by the entry 303a, has no version and a date stamp of Jun. 12, 1998. In step 210, it is determined (as previously indicated) that the destination file has no version; therefore, execution proceeds to step 214. In step 214, the entry 307c is selected as having the newest date stamp (Oct. 16, 1998). In step 216, the entries 307a and 307d are marked for deletion.

In step 218, a determination is made whether there are more groups to be processed. In the illustrated example, there are (i.e., the groups relating to c:\progra~1 and c:\windows\runprog.exe); therefore, execution proceeds to step 219, in which the next group (i.e., c:\progra~1) is selected for processing, and then returns to step 208.

In step 208, the version and/or date stamps for the entries of the c:\progra~1 group are obtained. In particular, the entry 307b has a Version 1.21 and a date stamp of Jan. 6, 1998 and the entry 307f has a Version 1.19 and a date stamp of Apr. 14, 1998. The destination file, as represented by the entry 303b, has a Version 1.20 and a date stamp of May 11, 1998. In step 210, it is determined that, as previously indicated, the destination file does have a version (Version 1.20); therefore, execution proceeds to step 212, in which it is determined that the entry 307b includes the newest version file (Version 1.21). In step 216, the entry 307f is marked for removal. In step 218, it is determined that there is another group to be processed and execution proceeds to step 219, in which the remaining group (c:\windows\runprog.exe) is selected for processing. Execution then returns to step 208.

In step 208, the version and/or date stamps for the entries of the c:\windows\runprog.exe group are obtained. In particular, the entry 307e has no version and a date stamp of May 17, 1998. The destination file, as represented by the entry 303c, has no version and a date stamp of Aug. 29, 1998. In step 210, a determination is made that the destination file does not have a version; therefore, execution proceeds to step 214, in which it is determined that the destination file has the newer time stamp (Aug. 29, 1998). In step 216, the entry 307e is marked for removal.

In step 218, it is determined that there are no more groups to be processed; therefore, execution proceeds to step 220, in which the marked Wininit.ini entries 307a, 307d–307f are deleted and their associated source files are either marked for deletion, as described above, or deleted. The updated Wininit.ini file 300' (with entries 307a and 307d–307f deleted) is shown in FIG. 3c. FIG. 3d illustrates a list of entries 303a', 303b', and 303c corresponding to destination files on the hard drive after the updated Wininit.ini file 300' has been executed upon reboot of the computer. It will be noted that the newer version of each of the files c:\windows\system, c:\progra~1, and c:\windows\runprog.exe, respectively, is stored in the hard drive. In particular, the first two destination files have been updated using the source files listed in the updated Wininit.ini file 300', while the last destination file, because it was actually the newest version of the file, remains unchanged.

Although an illustrative embodiment has been shown and described, a wide range of modification, change, and substitution is contemplated in the foregoing disclosure and in some instances, some features of the embodiment may be employed without a corresponding use of other features. Accordingly, it is appropriate that the appended claims be construed broadly and in a manner consistent with the scope of the embodiment disclosed herein.

What is claimed is:

1. In a computer system including a group of files comprising a destination file and one or more source files for updating said destination file, and further including an update file comprising entries corresponding to each of said one or more source files, a method for ensuring that only a newest version of said destination file and said one or more source files is included on said computer system, the method comprising the steps of:

determining which of said group of files is the newest;
   marking each of said update file entries corresponding to all but said one of said group of files determined to be the newest; and
   deleting all of said marked update file entries.

2. The method of claim 1 further comprising the step of marking for deletion said source files to which said marked update file entries correspond.

3. The method of claim 1 further comprising the step of deleting said source files to which said marked update file entries correspond.

4. The method of claim 1 wherein said determining comprises:

determining whether said destination file has a version number;
   if said destination file does have a version number, determining which of said destination and said one or more source files has the newest version number; and
   if said destination file does not have a version number, determining which of the destination and one or more source files has the newest date and time stamp.

5. The method of claim 1 wherein said computer system comprises a plurality of groups of files, each of said groups of files comprising a destination file and one or more source files corresponding to said destination file, and wherein said update file comprises an entry corresponding to each of said source files, wherein said determining, marking, and deleting are performed for each of said groups of files.

6. The method of claim 1 further comprising the step of, subsequent to said deleting, rebooting said computer system.

7. The method of claim 6 further comprising the step of, responsive to said rebooting, executing said update file.

8. The method of claim 1 wherein an operating system of said computer system is a WINDOWS 9x operating system and said update file is a Wininit.ini file.

9. The method of claim 8 further comprising the step of, prior to said determining, determining whether said update file exists on said computer system.

10. In a computer system including a group of files comprising a destination file and one or more source files for updating said destination file, and further including an update file comprising entries corresponding to each of said one or more source files, an apparatus for ensuring that only a newest version of said destination file and said one or more source files is included on said computer system, the apparatus comprising:

means for determining which of said group of files is the newest;
    means for marking each of said update file entries corresponding to all but said one of said group of files determined to be the newest; and
    means for deleting all of said marked update file entries.

11. The apparatus of claim 10 further comprising means for marking for deletion said source files to which said marked update file entries correspond by making an entry in said update file.

12. The apparatus of claim 10 further comprising means for deleting said source files to which said marked update file entries correspond.

13. The apparatus of claim 10 wherein said means for determining comprises:

means for determining whether said destination file has a version number;

means for determining which of said destination and said one or more source files has the newest version number if said destination file does have a version number; and means for determining which of the destination and one or more source files has the newest date and time stamp if said destination file does not have a version number.

14. The apparatus of claim 10 wherein said computer system comprises a plurality of groups of files, each of said groups of files comprising a destination file and one or more source files corresponding to said destination file, and wherein said update file comprises an entry corresponding to each of said source files, wherein said determining, marking, and deleting are performed for each of said groups of files.

15. The apparatus of claim 10 further comprising means for rebooting said computer system subsequent to said deleting.

16. The apparatus of claim 15 further comprising means for executing said update file responsive to said rebooting.

17. The apparatus of claim 10 wherein an operating system of said computer system is a WINDOWS 9x operating system and said update file is a Wininit.ini file.

18. The apparatus of claim 10 further comprising means for determining whether said update file exists on said computer system prior to said determining.

19. A computer program product for use by a computer system including a group of files comprising a destination file and one or more source files for updating said destination file, and further including an update file comprising entries corresponding to each of said one or more source files, a method for ensuring that only a newest version of said destination file and said one or more source files is included on said computer system, the computer program product comprising:

a computer program processable by a computer system for:

determining which of said group of files is the newest;

marking each of said update file entries corresponding to all but said one of said group of files determined to be the newest; and deleting all of said marked update file entries; and an apparatus from which said computer program is accessible by said computer system.

20. The computer program product of claim 19 wherein said computer program is processable by a computer system for marking for deletion said source files to which said marked update file entries correspond.

21. The computer program product of claim 19 wherein said computer program is processable by a computer system for deleting said source files to which said marked update file entries correspond.

22. The computer program product of claim 19 wherein said determining comprises:

determining whether said destination file has a version number;

if said destination file does have a version number, determining which of said destination and said one or more source files has the newest version number; and if said destination file does not have a version number, determining which of the destination and one or more source files has the newest date and time stamp.

23. The computer program product of claim 19 wherein said computer system comprises a plurality of groups of files, each of said groups of files comprising a destination file and one or more source files corresponding to said destination file, and wherein said update file comprises an entry corresponding to each of said source files, wherein said determining, marking, and deleting are performed for each of said groups of files.

24. The computer program product of claim 19 wherein said computer program is further processable by said computer system for, subsequent to said deleting, rebooting said computer system.

25. The computer program product of claim 24 wherein said computer program is further processable by said computer system for, responsive to said rebooting, executing said update file.

26. The computer program product of claim 19 wherein an operating system of said computer system is a WINDOWS 9x operating system and said update file is a Wininit.ini file.

27. The computer program product of claim 19 wherein said computer program is further processable by said computer system for, prior to said determining, determining whether said update file exists on said computer system.

* * * * *